United States Patent [19]

Bolton

[11] Patent Number: 4,671,724

[45] Date of Patent: Jun. 9, 1987

[54] MULTI-BEAM STRUCTURE CLIP

[76] Inventor: Gary R. Bolton, 9240 Carmelita Ave., Atascadero, Calif. 93422

[21] Appl. No.: 809,486

[22] Filed: Dec. 13, 1985

[51] Int. Cl.⁴ ............................................ B65G 59/06
[52] U.S. Cl. .................................. 414/126; 52/125.6;
221/283; 221/301; 294/81.51; 294/113; 414/10
[58] Field of Search ..................... 414/10, 12, 97, 125,
414/126, 127, 786; 294/81.5, 81.51, 82.32, 113;
221/186, 190, 283, 301; 187/2; 104/2, 5;
52/125.3, 125.6

[56] References Cited

U.S. PATENT DOCUMENTS

| | | | |
|---|---|---|---|
| 2,472,843 | 6/1949 | Muise | 414/10 X |
| 2,717,801 | 9/1955 | Neil | 52/125.6 X |
| 2,965,408 | 12/1960 | Edwards | 294/81.5 X |
| 3,034,684 | 5/1962 | Jackson | 221/301 X |
| 3,112,038 | 11/1963 | Breivik | 414/96 |

FOREIGN PATENT DOCUMENTS

| | | | |
|---|---|---|---|
| 832578 | 2/1952 | Fed. Rep. of Germany | 294/81.5 |
| 102427 | 8/1941 | Sweden | 414/126 |
| 496221 | 3/1976 | U.S.S.R. | 294/81.5 |

Primary Examiner—Leslie J. Paperner
Attorney, Agent, or Firm—Daniel C. McKown

[57] ABSTRACT

A multi-beam structure clip for transporting and dispensing I-beams includes two legs which straddle a stack of I-beams and which include at their lower ends dogs which extend under the upper flange of the bottom I-beam in the stack to support the stack within the clip. Each dog includes a lobe located so as to contact the upper surface of the lower flange of the bottom I-beam as the clip is lowered with the bottom I-beam being supported. Contact of the lobe against that surface pivots the dog to a retracted position so that the tip of the dog clears the upper flange of the bottom beam when the clip is raised, thereby freeing the bottom I-beam. However, as the clip is raised, the lobes of the dogs contact the lower surface of the upper flange of the bottom I-beam causing the dogs to pivot inwardly to an extended position so that as the clip is further raised, the tips of the dogs engage the lower surface of the upper flange of the next-to-bottom I-beam.

4 Claims, 14 Drawing Figures

MULTI-BEAM STRUCTURE CLIP

BACKGROUND OF THE INVENTION

1. Field of the Invention

The present invention is in the field of material handling and more specifically relates to apparatus for transporting and dispensing I-beams.

2. The Prior Art

In Soviet Patent No. 935,413 of Odess Steel Rolling, there is shown an apparatus for dispensing empty pallets one at a time. A stack of empty pallets rests on a lifting table which moves in a vertical direction. Associated with the lifting table are dogs which in response to downward motion of the lifting table engage the next-to-bottom pallet in the stack, and thereby support the stack while the lifting table continues to move downwardly with the bottommost pallet resting on it. In this manner, the apparatus dispenses the bottom pallet from the stack. In contrast, the clip of the present invention does not require the use of a lifting table, and can be used for transporting the beams to the location at which they are to be dispensed.

In U.S. Pat. No. 3,112,038, Breivik shows an apparatus for stacking I-beams, but the beams are stacked on their sides and are nested, which would not serve for those applications in which the present invention is used and in which the beams are to be installed in an upright orientation. Breivik's apparatus is not used for dispensing beams one at a time, but instead is used to form a stack by picking up beams.

Swedish Pat. No. 102,427 of Broman shows a device for dispensing logs one at a time. The apparatus is actuated by legs which are moved by contact with the ground or other surface.

In U.S. Pat. No. 3,873,000, Eaton, et al. show an apparatus for dispensing sticks of lumber one at a time.

In U.S. Pat. No. 3,976,320, Holladay, et al. show a device for lifting a stack of chicken coops. The apparatus includes manually-operated tines that engage the top of the lowest chicken coop in a stack.

Upon closer study of the above patents, it will be seen that all of them have a different structure and function in a different way from the present invention.

SUMMARY OF THE INVENTION

The structural clip of the present invention is a device for stacking I-beams, for holding the beams during transportation to a construction site, and for dispensing the beams one at a time at the construction site.

Typically, the beams to be used in construction are prepared, not at the construction site, but at a remote site where the beams are cut to the desired length and provided with holes for the rivets or with mounting plates. The prepared beams are identified by numbers painted on them. The beams are typically sitting on sawhorses at this stage.

The present invention is fitted with a special loading attachment which permits the beams to be picked up from the sawhorses one at a time in any desired sequence. Once the beams have been loaded into the clip, the clip is loaded onto a truck for transportation to the construction site.

A typical clip will hold six I-beams that are 10 inches high, or eight I-beams that are 8 inches high or ten I-beams that are 6 inches high, or various combinations of the beams. The trailer that transports the beams to the construction site typically carries 12 clips.

Upon arrival at the construction site, the loaded clips are then unloaded in a storage area awaiting use.

In use, a crane picks up a clip containing a number of I-beams and carries the clip to the location in the structure at which the first I-beam is to be dispensed. The clip is lowered into a position which permits the lowest I-beam in the stack to be secured into its position, such as by welding or riveting. Thereafter, the clip is moved by the crane to the next location, which typically is adjacent the first location, and a second beam is set in place.

The advantage of the invention can best be seen by considering that in the prior art technique of construction it was necessary for the crane to lift the I-beams one at a time from their storage area on the ground to the elevated position at which they were to be set. This prior art process thus required as many trips by the crane from the storage area to the part of the building under construction as there were I-beams to be used. Particularly where the building under construction was many stories high, much time was consumed by the workers in waiting for the next I-beam to be delivered by the crane. Typically, with the prior art method, it was possible to set 12 I-beams in 90 minutes. In contrast, when the present invention is used, it is possible to set 6 I-beams in 8½ minutes—a factor of five improvement.

This improvement results from the fact that in the present invention a number of I-beams are transported together in the clip from the storage position on the ground to the elevated position at which the beams are to be installed.

An important aspect of the present invention is the use of a dog having an integral lug that interacts with the flanges of the I-beams to extend and retract the dog at appropriate points in the dispensing sequence.

During the dispensing process, the bottom beam in the stack is attached to the structure of the building while it is still in the clip. In this way, the bottom beam is supported by the structure of the building, and the other beams in the stack rest on the bottom beam. At this stage, the clip is lowered until the lugs on the dogs contact the lower flange of the bottom I-beam, which causes the dogs to pivot to a retracted position. With the dogs in this retracted position, the clip is then raised with respect to the stationary stack until the lug portion of the dog interacts with the upper flange of the bottom beam, thereby causing the dogs to pivot to an extended position in which they engage the upper flange of the next-to-bottom beam. At this point, the weight of the stack is taken up again by the clip, and the clip is then moved to the next dispensing location, leaving the bottom beam in place in the structure.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 13 is a fractional elevation view partly cut away and showing an alternative embodiment; and, FIG. 14 is a fractional elevation view showing another alternative embodiment.

DETAILED DESCRIPTION OF THE PREFERRED EMBODIMENT

Figure 1:
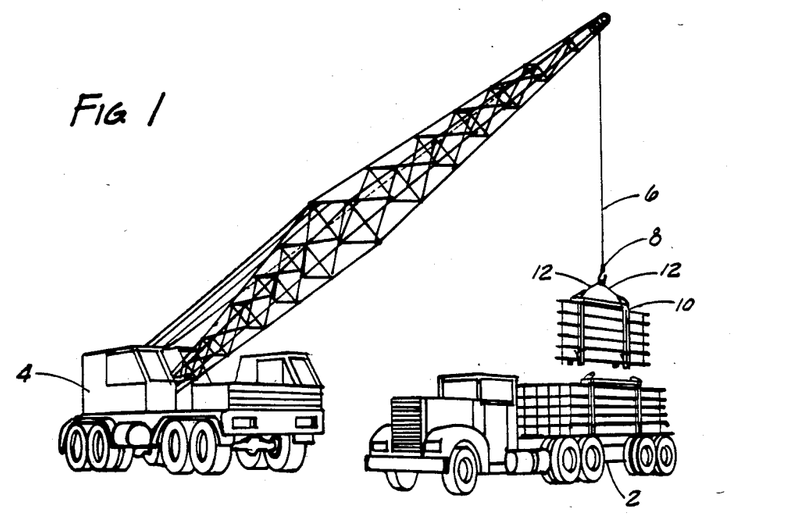
FIG. 1 is a perspective view showing the multi-beam structure clip of the present invention being unloaded from a truck at a construction site.

Turning now to the drawings in which like parts are denoted by the same reference numerals throughout, FIG. 1 shows a trailer 2 being unloaded at a construction site by a crane 4. A number of multi-beam structural clips, of which the clip 10 is typical are transported on the trailer from a fabrication site to the construction site. The cable 6 of the crane 4 terminates in a hook 8 that engages slings 12 for lifting the clip 10. Typically, the clips 10 are unloaded from the truck and placed on the ground to await installation.

Figure 2:
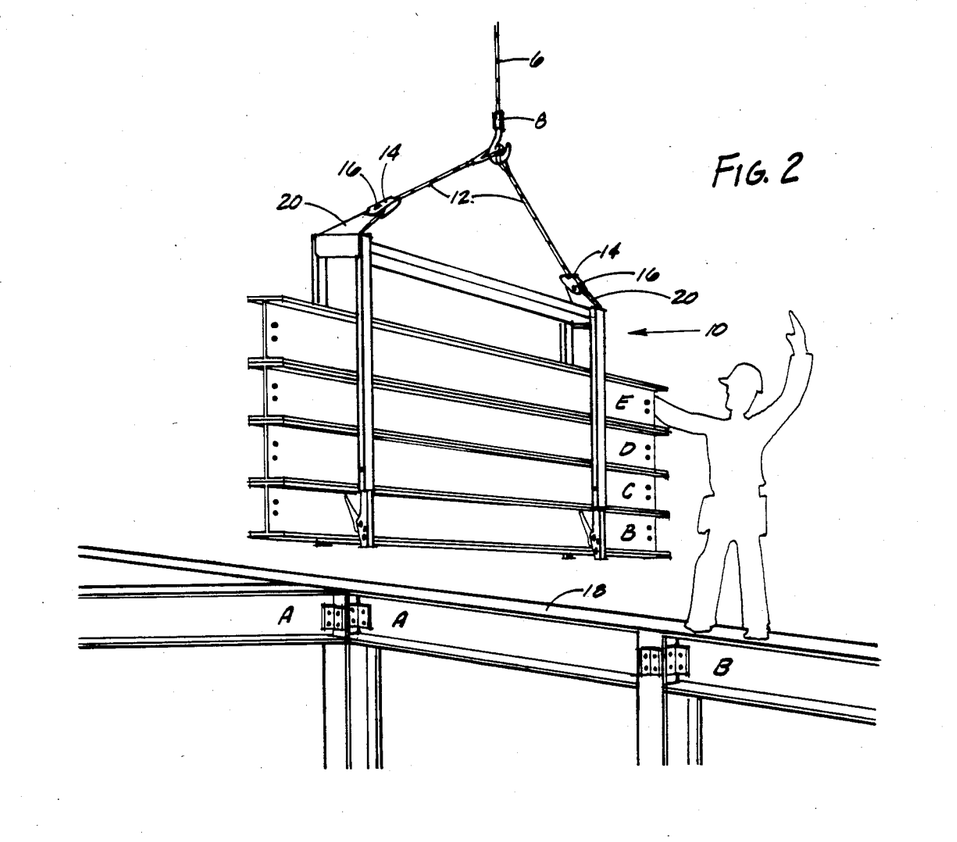
FIG. 2 is a perspective view showing the multi-beam structure clip of the present invention being lowered into position to dispense a beam.

FIG. 2 shows the installation phase in which the clip 10 has been hoisted by the crane to an elevated location in the structure 18 being built. In FIG. 2 it can be seen more clearly that the slings 12 include loops at their upper end that engage the hook 8 and include shackles 14 at their lower ends, which shackles engage lifting eyes 16 in the brackets 20. Typically, the I-beams are given identifying indicia that indicate where they are to be installed in the structure 18.

Figures 3, 4:
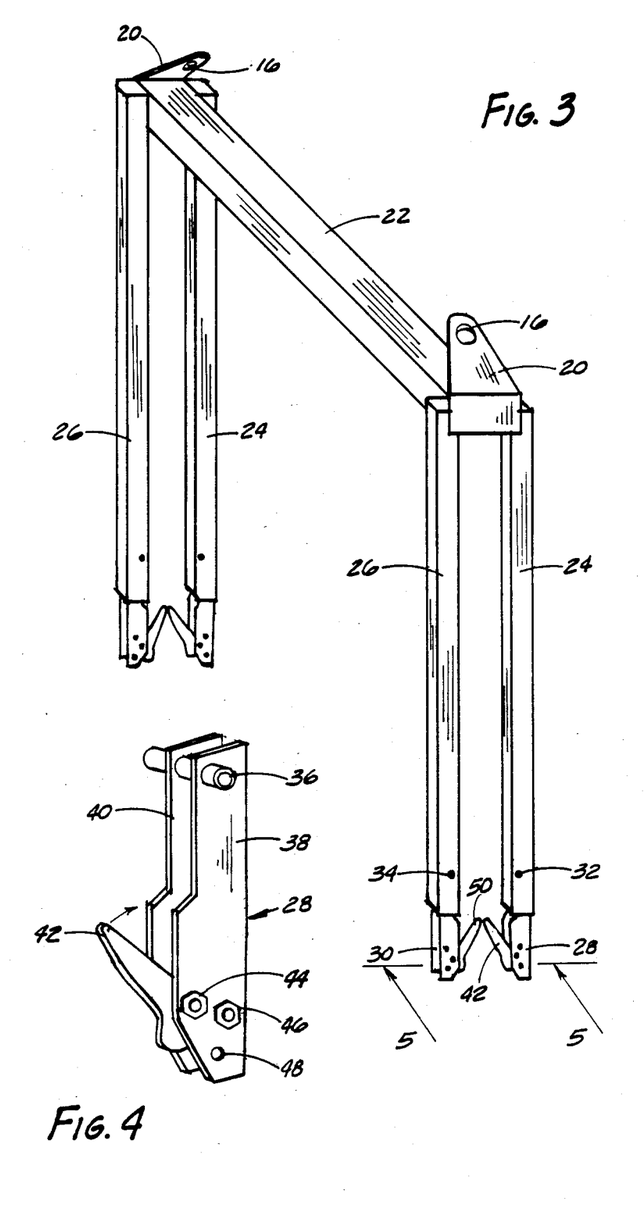
FIG. 3 is a perspective view showing a preferred embodiment of the multi-beam structure clip of the present invention in an empty state.
FIG. 4 is a perspective view showing a portion of the multi-beam structure clip of FIG. 3.
Figure 5:
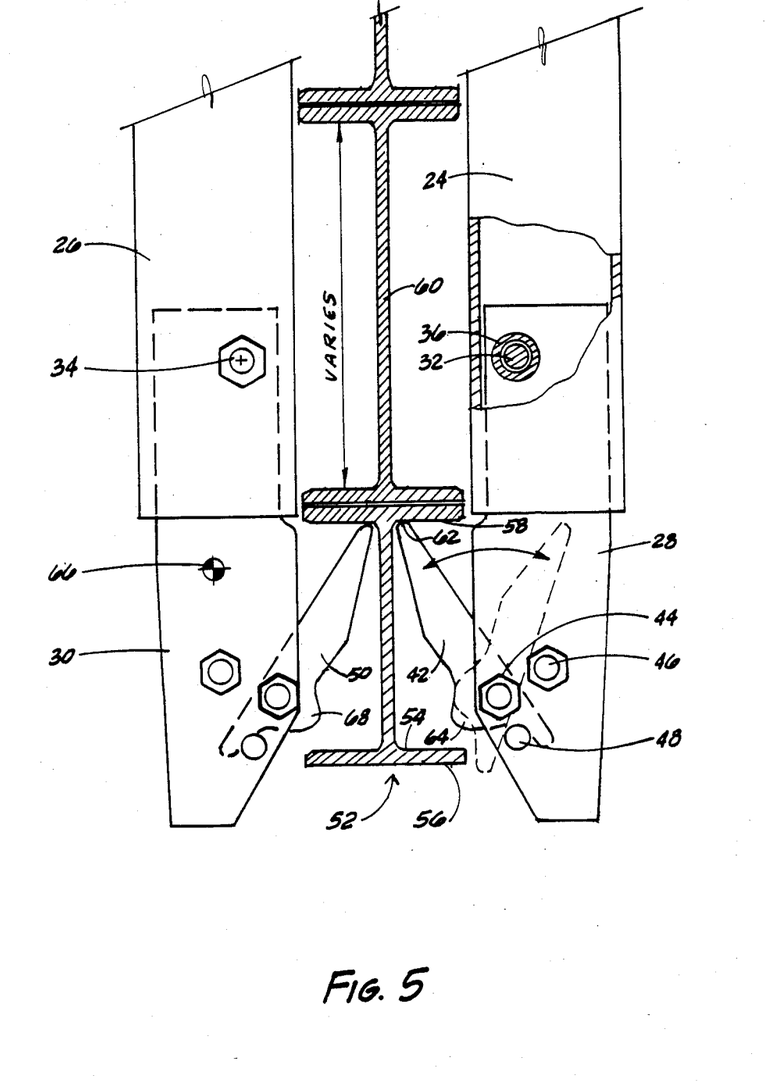
FIG. 5 is a fractional side elevation view partly in cross section in the direction 5—5 indicated in FIG. 3.

The multi-beam structure clip 10 of the present invention is shown more clearly in FIGS. 3-5. It consists of a horizontal box beam 22 from the ends of which pairs of identical legs depend. Each of the pairs includes a right leg 24 and a left leg 26. All four legs are welded to the box beam 22, and the bracket 20 is welded both to the box beam 22 and to the legs 24, 26. Each of the legs is a hollow box beam. Identical dog housings are mounted within the bottom end of each of the legs; the dog housings denoted generally by the numerals 28, 30 being mounted respectively in the legs 24, 26.

As best seen in FIG. 4, the dog housing 28 includes two spaced side plates 38, 40 through which a pipe 36 extends. A pin 32 of FIGS. 3 and 5 extends through the pipe 36 to engage the dog housing 28 to the leg 24 for limited pivotal motion about the axis of the pipe 36. The dog 42 is mounted between the side plates 38, 40 for pivotal motion about the axis of the pivot pin 44. As best seen in FIG. 5, the stop pin 46 limits the motion of the dog 42, and the lock pin 48 is inserted prior to transportation, as a safety measure, to prevent retraction of the dog 42. The pivot pin 44 and the lock pin 48 may conveniently consist of bolts.

As shown in FIG. 5, the dog 42, which is typical of all of the dogs, includes a tip 62 that extends beneath and supports the lower surface 58 of the upper flange of the bottom I-beam 52. The dog 42 also includes a lobe 64 that extends into the space between the flanges of the I-beam and that interacts with those flanges to extend and to retract the dog 42 from its fully extended position shown by the solid lines in FIG. 5 to its fully retracted position shown by the dashed lines in FIG. 5. FIG. 5 also shows that the clip of the present invention can be loaded with I-beams of various heights, provided the flanges have the same width.

It should be noted in connection with FIG. 5, that the center of gravity 66 of the dog housing 30, determined with the dog 50 in its extended position as shown is located to the outside of a vertical line through the axis of the pin 34. This permits gravity to urge the pendulous dog housing 30 inwardly when the weight of the stack of beams is not being supported by the tips of the dogs. The purpose of this is to provide greater assurance that the lobe 68 will contact the flanges of the I-beams even when the I-beams are not exactly centered within the clip owing to the clearance required between the legs 24, 26 to permit smooth operation and to accommodate minor variations in the widths of the flanges of the I-beams.

FIGS. 6 through 12 show the relation of the clip to the I-beams carried by it and show the operation of the dogs and dog housings at selected stages of the process of dispensing the bottom I-beam 52.

Figure 6:
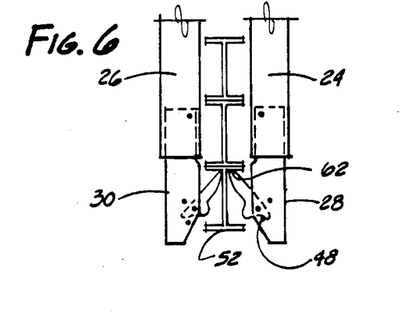
FIGS. 6 through 12 are diagrams showing the apparatus of FIG. 5 at successive stages in the process of dispensing an I-beam.

FIG. 6 shows the clip in the configuration used during transportation on the truck 2. In this configuration, the weight of the stack of I-beams is supported by the tips 62 of the dogs, and the lock pins 48 prevent the dogs from being withdrawn from their engagement with the bottom I-beam 52. The weight of the stack of I-beams urges the dog housings 28, 30 apart.

At the construction site, the lock pins 48 are withdrawn, and the clip is hoisted by the crane 4 to an elevated position. The bottom I-beam 52 is maneuvered into its desired position and secured there through the use of rivets or welding. Thereafter, the bottom I-beam 52 is supported by the structure 18 rather than by the legs 24, 26, and this fact is indicated in the drawings by the small triangles beneath the bottom I-beam 52 that denote support.

Figure 7:
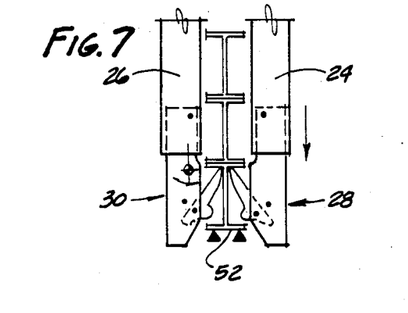

FIG. 7 shows that with the beam 52 thus supported, the clip is lowered by the crane, as indicated by the arrows, and the pendulum action of the dog housings 28, 30 urges them together.

Figure 8:
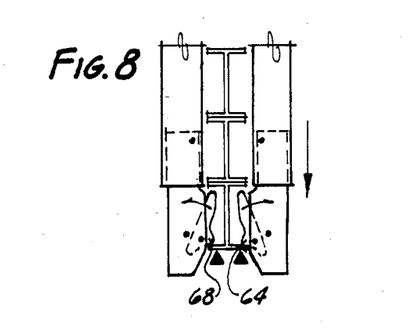

This lowering of the clip continues until it is in the position shown in FIG. 8, at which the lobes 64, 68 make contact with the upper surface 54 of the lower flange of the bottom I-beam.

Figure 9:
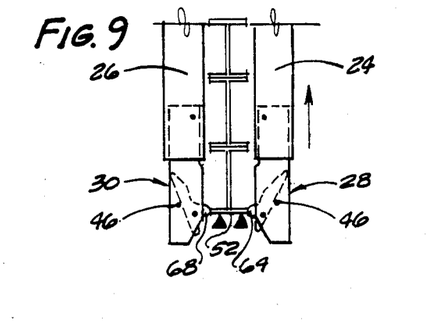
Figure 10:
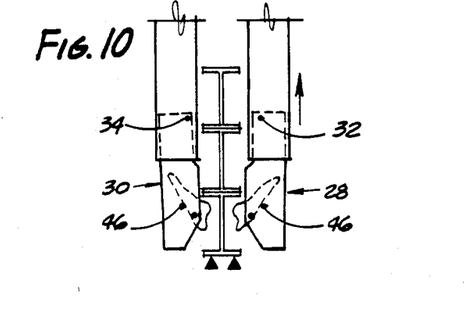

A further slight amount of lowering of the clip causes the dogs 42, 50 to pivot to their retracted positions as shown in FIG. 9. As indicated in FIG. 9, the lobes 64, 68 are prevented from moving below the lower flange of the bottom I-beam by the inability of the dog housings 28, 30 to move apart sufficiently to permit the lobes to get past the lower flange. It is possible for the weight of the clip to rest on the lower flange of the I-beam 52 until the crane operator can cause the crane to hoist the clip upward as shown in FIG. 10. The stop pins 46 limit the pivoting motion of the dogs.

Figure 11:
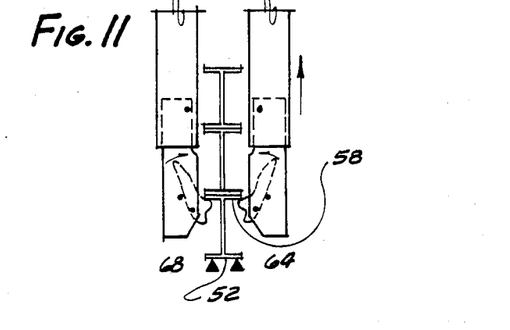
Figure 12:
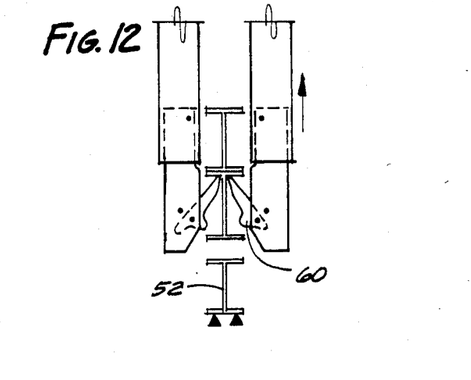

With the clip moving upwards as shown in FIG. 10, the dog housings 28, 30 pivot toward one another about the pins 32, 34 respectively, and this insures that the lobes 64, 68 will strike the lower surface 58 of the upper flange of the bottom I-beam 52, as shown in FIG. 11. Further upward movement, beyond that shown in FIG. 11, causes the dogs to be pivoted to their extended position against the center web of the next-to-bottom I-beam 60, as shown in FIG. 12. At this point, the weight of the stack of I-beams is borne by the dogs, and the bottom I-beam 52 is left behind in its proper position. The crane 4 then moves the clip to the location where the next I-beam is to be installed, and the dispensing process is repeated at that location.

After the clip 10 has been emptied, the crane 4 lowers it from the elevated position to the ground and thereafter, the clip is transported to the fabrication site to be refilled.

Refilling of the clip is accomplished as follows. In the preferred embodiment, the dog housings 28, 30 are removed from the four legs, and are replaced by special loading dog housings. The special loading dog housings each include a dog similar to the dogs of the housings 28, 30, but lacking the lobe 64 and having a slightly longer distance between the pivot and the tip of the dog. Because they lack the lobe, the loading dog housings can accept I-beams that are inserted from below. Each time a beam is inserted, the loading dogs swing into position under the action of gravity beneath the upper flange of the beam and prevent it from falling back out of the clip.

Typically, the I-beams to be loaded into the clip are resting on sawhorses or other supports while the beams are being prepared for installation by drilling holes in them or by welding plates to them and by marking the beams for identification. With the loading dog housings attached to the legs, a crane lowers the clip over each supported beam in succession, causing the beam to be engaged by the loading dogs. Thus, the beams are inserted one by one into the bottom of the clip until the clip has been filled with a desired number of beams.

At that point, the clip is moved to a position where the bottom beam in the clip can be supported on sawhorses or otherwise, and at that stage the loading dog housings are removed from the four legs, and replaced by the dispensing dog housings 28, 30. Because the distance from the pivots 44 to the tip of the loading dogs is slightly greater than the comparable distance of the dispensing dogs, there is no difficulty in inserting the dispensing dogs into position under the upper flange of the bottom I-beam of the stack. Thereafter, the lock pins 48 are inserted for safety in transporting the loaded clips.

In an alternative embodiment, instead of replacing the dispensing dog housings 28, 30 with special loading dog housings, only the dogs themselves are replaced by the special loading dogs which lack the lobes and which are slightly longer between the pivot and the tip of the dog.

In the preferred embodiment shown in FIG. 5, the force of gravity was utilized to yieldably bias the lower portions of the dog housings 28, 30 toward each other. In an alternative embodiment shown in FIG. 13, other means for yieldably biasing the dog housings are shown. A bracket 70 within the leg 24 serves as an abutment for a compression spring 72, which bears against the upper end 74 of the dog housing 28, exerting a force indicated symbolically by the force arrow 76. This force biases the dog housing 28 in the direction indicated by the arrow 78.

Likewise, in the preferred embodiment shown in FIG. 5, the dog 42 was mounted on the pivot pin 44 with the center of gravity of the dog being higher than the pivot pin. Accordingly, gravity was used to alternately yieldably bias the dog 42 to the extreme positions shown in FIG. 5.

Figures 13, 14:
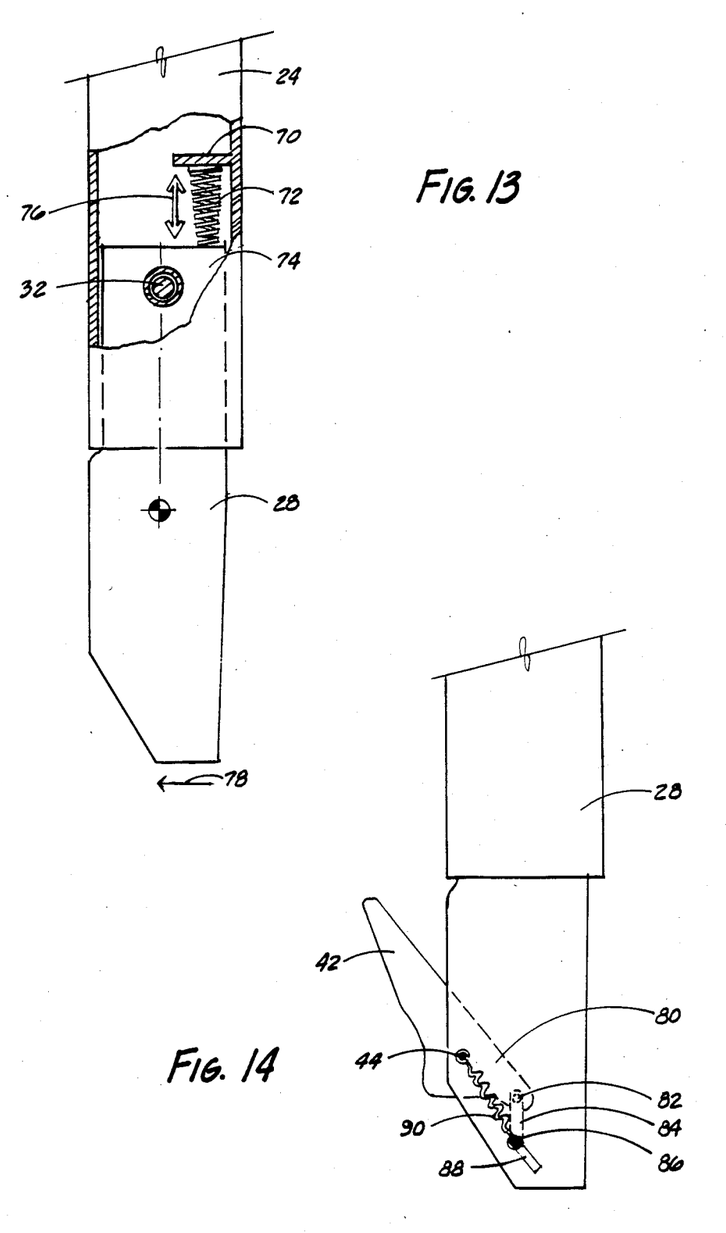

In an alternative embodiment shown in FIG. 14, other means for yieldably biasing the dog 42 are shown. A pin 82 extends from one end 80 of the dog 42 parallel to the pivot pin 44. This pin 82 is connected by a link 84 to a second pin 86 that extends through and beyond the dog housing 28. The second pin 86 slides in the slot 88 in the wall of the dog housing 28, and a tension spring 90 is connected between the exposed end of the pin 86 and a projection of the pivot pin 44. The pull of the tension spring 90 against the pin 86 pushes the link 84 against the pin 82, thereby yieldably urging the dog 42 to its extended position (shown) or to its retracted position, alternately. This means imparts to the dog 42 a toggle action that is independent of and in addition to the gravitational forces.

In prior art systems, the practice was to pick up each I-beam separately with the crane and hoist it to the elevated position in the structure and then to return the crane hook 8 to the ground so that the next I-beam could be carried to the elevated poisition. This necessitated a round trip from the ground to the elevated location and back to the ground for each I-beam that was to be used. In contrast, in the present invention the number of round trips is reduced by a factor equal to the number of beams carried by the clip. For example, if five beams are carried by the clip, only one-fifth as many round trips are required. This results in considerable savings of time and expense, since not only is the crane used for a shorter amount of time, but also, the workers at the elevated location are not kept waiting for the arrival of a new I-beam.

Thus, there has been described a multi-beam structure clip that is particularly useful in transporting, lifting, and dispensing I-beams to their intended locations.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. A clip for holding and for dispensing one at a time a number of I-beams stacked with their flanges horizontal and their webs vertical, said clip comprising in combination:

first and second legs extending parallel and vertically, each having an upper portion and a lower portion, and spaced apart by an amount equal to the width of the flange of an I-beam plus a relatively small clearance to permit the I-beam to pass freely in the direction of the legs;

structural means rigidly connecting the upper portions of said first and second legs;

first and second dog housings each having an upper portion and a lower portion and pivotably attached at their upper portions to said first and second legs respectively for limited swinging motion about axes perpendicular to the plane of said first and second legs, the centers of gravity of said first and second dog housings being farther apart than the pivot points so that gravity yieldably urges the lower portions of the dog housings toward each other;

first and second dogs pivotably attached to the lower portions of said first and second dog housings respectively for limited swinging motion about axes perpendicular to the plane of said first and second legs, the center of gravity of each leg being higher at all points in its limited motion than the axis about which the dog pivots, each dog being a unitary element and including an elongated finger-like portion terminating in a tip and further including a lobe portion extending transversely to the direction of the elongated finger-like portion, each dog being pivotable between a first extreme position in which the tip of the dog extends against the web of an I-beam and the center of gravity of the dog is closer to the web than is the pivot axis of the dog, to a second extreme position in which the finger-like portion of the dog is withdrawn outwardly from the space between said first and second dog housings and the center of gravity of the dog is farther from the web than is the pivot axis of the dog, said lobe portions extending into the space between said first and second dog housings at all positions of the dog, whereby, when the bottom I-beam is supported and the legs are lowered with respect to the stack of I-beams, the lobe portions make contact with the lower flange of the bottom I-beam, forcing the dogs to rotate to their second extreme position, releasing the bottom I-beam, so that when the legs are then raised, the tips of the dogs clear the upper flange of the bottom I-beam and the lower flange of the next-to-bottom I-beam, and so that further raising of the legs causes the lobe portions to make contact with the upper flange of the bottom I-beam, forcing the dogs to rotate to their first extreme position with the tips of the dogs then bearing against the web of the next-to-bottom I-beam, and so that still further raising of the legs causes the first and second dog housings to pivot apart to permit the lobes to pass the upper flange of the bottom I-beam and the lower flange of the next-to-bottom I-beam, whereupon further raising of the legs brings the tips of the dogs into contact with the upper flange of the next-to-bottom I-beam to support it.

2. A clip for holding and for dispensing one at a time a number of I-beams stacked with their flanges horizontal and their webs vertical, said clip comprising in combination:

first and second legs extending parallel and vertically, each having an upper portion and a lower portion, and spaced apart by an amount equal to the width of the flange of an I-beam plus a relatively small clearance to permit the I-beam to pass freely in the direction of the legs;

structural means rigidly connecting the upper portions of said first and second legs;

first and second dog housings each having an upper portion and a lower portion and pivotably attached at their upper portions to said first and second legs respectively for limited swinging motion about axes perperdicular to the plane of said first and second legs;

biasing means connected between said first and second legs and said first and second dog housings respectively for yieldably biasing the lower portions of said first and second dog housings toward each other;

biasing means for yieldably biasing the lower portions of said first and second dog housings toward each other;

first and second dogs pivotably attached to the lower portions of said first and second dog housings respectively for limited swinging motion about axes perpendicular to the plane of said first and second legs, the center of gravity of each leg being higher at all points in its limited motion than the axis about which the dog pivots, each dog being a unitary element and including an elongated finger-like portion terminating in a tip and further including a lobe portion extending transversely to the direction of the elongated finger-like portion, each dog being pivotable between a first extreme position in which the tip of the dog extends against the web of an I-beam and the center of gravity of the dog is closer to the web than is the pivot axis of the dog, to a second extreme position in which the finger-like portion of the dog is withdrawn outwardly from the space between said first and second dog housings and the center of gravity of the dog is farther from the web than is the pivot axis of the dog, said lobe portion extending into the space between said first and second dog housings at all positions of the dog, whereby, when the bottom I-beam is supported and the legs are lowered with respect to the stack of I-beams, the lobe portions make contact with the lower flange of the bottom I-beam, forcing the dogs to rotate to their second extreme position, releasing the bottom I-beam, so that when the legs are then raised, the tips of the dogs clear the upper flange of the bottom I-beam and the lower flange of the next-to-bottom I-beam, and so that further raising of the legs causes the lobe portions to make contact with the upper flange of the bottom I-beam, forcing the dogs to rotate to their first extreme position with the tips of the dogs then bearing against the web of the next-to-bottom I-beam, and so that still further raising of the legs causes the first and second dog housings to pivot apart against the biasing force of said biasing means to permit the lobes to pass the upper flange of the bottom I-beam and the lower flange of the next-to-bottom I-beam, whereupon further raising of the legs brings the tips of the dogs into contact with the upper flange of the next-to-bottom I-beam to support it.

3. A clip for holding and for dispensing one at a time a number of I-beams stacked with their flanges horizontal and their webs vertical, said clip comprising in combination:

first and second legs extending parallel and vertically from an upper portion to a lower portion and spaced apart by an amount equal to the width of the flange of an I-beam plus a relatively small clearance to permit the I-beam to pass freely in the direction of the legs;

means rigidly connecting the upper portions of said first and second legs;

first and second dog housings each having an upper portion and a lower portion and pivotably attached at their upper portions to said first and second legs respectively for limited swinging motion about axes perpendicular to the plane of said first and second legs, the centers of gravity of said first and second dog housings being farther apart than the pivot points so that gravity yieldably urges the lower portions of the dog housings toward each other;

first and second dogs pivotably attached to the lower portions of said first and second dog housings respectively for limited swinging motion about axes perpendicular to the plane of said first and second legs, each dog being a unitary element and including an elongated finger-like portion terminating in a tip and further including a lobe portion extending transversely to the direction of the elongated finger-like portion, each dog being pivotable between a first extreme position in which the tip of the dog extends against the web of an I-beam to a second extreme position in which the finger-like portion of the dog is withdrawn outwardly from the space between said first and second dog housings;

biasing means connected between each dog and its respective dog housing for yieldably urging said first and second dogs alternately to their first extreme positions and to their second extreme positions;

said lobe portion extending into the space between said first and second dog housings at all positions of the dog, whereby, when the bottom I-beam is supported and the legs are lowered with respect to the stack of I-beams, the lobe portions make contact with the lower flange of the bottom I-beam, forcing the dogs to rotate to their second extreme position, releasing the bottom I-beam, so that when the legs are then raised, the tips of the dogs clear the upper flange of the bottom I-beam and the lower flange of the next-to-bottom I-beam, and so that further raising of the legs causes the lobe portions to make contact with the upper flange of the bottom I-beam, forcing the dogs to rotate to their first extreme position with the tips of the dogs then bearing against the web of the next-to-bottom I-beam, and so that still further raising of the legs causes the first and second dog housings to pivot apart to permit the lobes to pass the upper flange of the bottom I-beam and the lower flange of the next-to-bottom I-beam, whereupon further raising of the legs brings the tips of the dogs into contact with the upper flange of the next-to-bottom I-beam to support it.

4. A clip for holding and for dispensing one at a time a number of I-beams stacked with their flanges horizontal and their webs vertical, said clip comprising in combination:

first and second legs extending parallel and vertically, each having an upper portion and a lower portion, and spaced apart by an amount equal to the width of the flange of an I-beam plus a relatively small clearance to permit the I-beam to pass freely in the direction of the legs;

structural means rigidly connecting the upper portions of said first and second legs;

first and second dog housings each having an upper portion and a lower portion and pivotably attached at their upper portions to said first and second legs respectively for limited swinging motion about axes perpendicular to the plane of said first and second legs;

first biasing means connected between said first and second legs and said first and second dog housings respectively for yieldably biasing the lower portions of said first and second dog housings toward each other;

first and second dogs pivotably attached to the lower portions of said first and second dog housings respectively for limited swinging motion about axes perpendicular to the plane of said first and second legs, each dog being a unitary element and including an elongated finger-like portion terminating in a tip and further including a lobe portion extending transversely to the direction of the elongated finger-like portion, each dog being pivotable between a first extreme position in which the tip of the dog extends against the web of an I-beam to a second extreme position in which the finger-like portion of the dog is withdrawn outwardly from the space between said first and second dog housings;

second biasing means connected between each dog and its respective dog housing for yieldably urging said first and second dogs alternately to their first extreme positions and to their second extreme positions;

said lobe portion extending into the space between said first and second dog housings at all positions of the dog, whereby, when the bottom I-beam is supported and the legs are lowered with respect to the stack of I-beams, the lobe portions make contact with the lower flange of the bottom I-beam, forcing the dogs to rotate to their second extreme position against the biasing force of said second biasing means, releasing the bottom I-beam, so that when the legs are then raised, the tips of the dogs clear the upper flange of the bottom I-beam and the lower flange of the next-to-bottom I-beam, and so that further raising of the legs causes the lobe portions to make contact with the upper flange of the bottom I-beam, forcing the dogs to rotate to their first extreme position against the biasing force of said second biasing means with the tips of the dogs then bearing against the web of the next-to-bottom I-beam, and so that still further raising of the legs causes the first and second dog housings to pivot apart against the biasing force of said first biasing means to permit the lobes to pass the upper flange of the bottom I-beam and the lower flange of the next-to-bottom I-beam, whereupon further raising of the legs brings the tips of the dogs into contact with the upper flange of the next-to-bottom I-beam to support it.

* * * * *